US012568118B2

(12) United States Patent　　　　(10) Patent No.:　US 12,568,118 B2
Lapuh et al.　　　　　　　　　　　(45) Date of Patent:　　　Mar. 3, 2026

(54) SHORTEST PATH BRIDGING (SPB) SECURITY GROUP POLICY

(71) Applicant: Extreme Networks, Inc., San Jose, CA (US)

(72) Inventors: Roger Lapuh, Uesslingen (CH); Constantin Barcaru, Brasov (RO); Ludovico Stevens, La Roquette sur Siagne (FR)

(73) Assignee: Extreme Networks, Inc., San Jose, CA (US)

( * ) Notice: Subject to any disclaimer, the term of this patent is extended or adjusted under 35 U.S.C. 154(b) by 289 days.

(21) Appl. No.: 18/194,741

(22) Filed: Apr. 3, 2023

(65) Prior Publication Data

US 2024/0333770 A1　　Oct. 3, 2024

(51) Int. Cl.
H04L 9/40　　　　　(2022.01)
(52) U.S. Cl.
CPC ............ H04L 63/20 (2013.01); H04L 63/102 (2013.01)
(58) Field of Classification Search
CPC ... H04L 63/20; H04L 63/102; H04L 12/4641; H04L 63/101; H04L 63/162
See application file for complete search history.

(56) References Cited

U.S. PATENT DOCUMENTS

2004/0160903 A1* 8/2004 Gai ...................... H04L 63/105
　　　　　　　　　　　　　　　　　　　370/254
2005/0129019 A1* 6/2005 Cheriton ................. H04L 63/08
　　　　　　　　　　　　　　　　　　　709/240
2006/0248227 A1* 11/2006 Hato ..................... H04L 12/465
　　　　　　　　　　　　　　　　　　　709/245
2008/0013481 A1* 1/2008 Simons ................. H04W 12/08
　　　　　　　　　　　　　　　　　　　370/328
2009/0049196 A1* 2/2009 Smith ................... H04L 63/104
　　　　　　　　　　　　　　　　　　　709/245
2011/0271102 A1* 11/2011 Smith ................... H04L 63/101
　　　　　　　　　　　　　　　　　　　713/160
2014/0086252 A1 3/2014 Keesara et al.
2014/0280834 A1* 9/2014 Medved .............. H04L 41/0609
　　　　　　　　　　　　　　　　　　　709/223

(Continued)

OTHER PUBLICATIONS

Sitti et al., "Optimizing Load Distribution for Shortest Path Bridging via Network Coding", Jan. 2014, International Conference on Computer Communication and Informatics, pp. 1-4 (Year: 2014).*

(Continued)

*Primary Examiner* — Kenneth W Chang
(74) *Attorney, Agent, or Firm* — Sterne, Kessler, Goldstein & Fox P.L.L.C.

(57)　　　　　ABSTRACT

Disclosed herein are system, method, and computer program product aspects for implementing a security group policy. Some aspects of this disclosure relate to a method for applying a security group policy. The method includes receiving a first frame from a source device and assigning a source security group identifier (ID) to the first frame. The method further includes generating a second frame based on the first frame and the source security group ID and identifying a target security group ID for the second frame. The method also includes applying one or more forwarding decisions to the second frame based on the source security group ID and the target security group ID.

17 Claims, 7 Drawing Sheets

(56)           References Cited

U.S. PATENT DOCUMENTS

| | | | | |
|---|---|---|---|---|
| 2014/0280838 | A1* | 9/2014 | Finn ........................ | H04L 49/00 |
| | | | | 709/223 |
| 2014/0369352 | A1 | 12/2014 | Zhou | |
| 2015/0156108 | A1* | 6/2015 | Shi .......................... | H04L 45/22 |
| | | | | 370/218 |
| 2016/0373441 | A1* | 12/2016 | Sirivara ............. | H04L 63/0869 |
| 2018/0063195 | A1* | 3/2018 | Nimmagadda ..... | H04L 63/0263 |
| 2023/0093278 | A1* | 3/2023 | Majila ................ | H04L 12/4645 |
| | | | | 709/238 |

OTHER PUBLICATIONS

International Search Report and Written Opinion of the International Searching Authority directed to International Patent Application No. PCT/US2024/011011, mailed Apr. 3, 2024; 11 pages.
"VXLAN Group Policy Option," Internet Engineering Task Force, M. Smith, Oct. 22, 2018, 6 pages.
"Overview of Cisco TrustSec," Chapter 2 of Cisco TrustSec Configuration Guide, 2021, 8 pages.
"Cisco TrustSec Configuration Guide," 2021, 126 pages.

\* cited by examiner

500
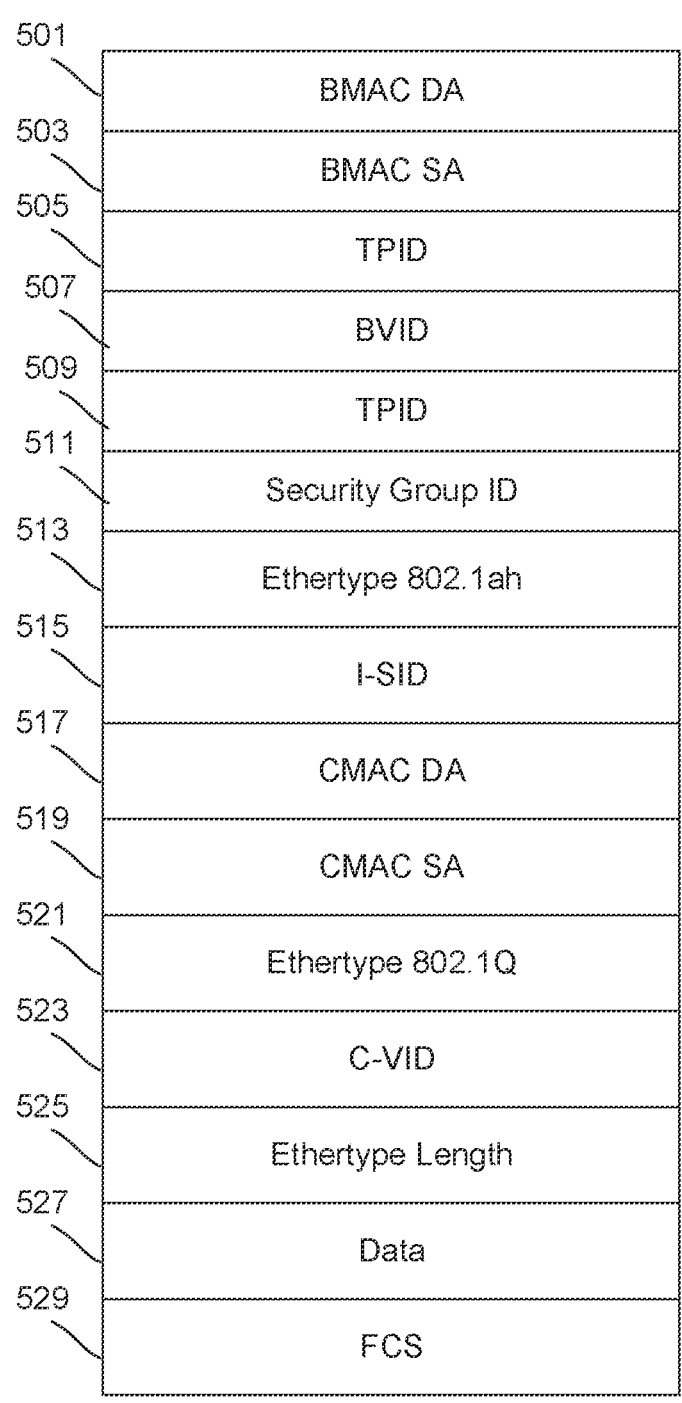
501 — BMAC DA
503 — BMAC SA
505 — TPID
507 — BVID
509 — TPID
511 — Security Group ID
513 — Ethertype 802.1ah
515 — I-SID
517 — CMAC DA
519 — CMAC SA
521 — Ethertype 802.1Q
523 — C-VID
525 — Ethertype Length
527 — Data
529 — FCS
FIG. 5

600

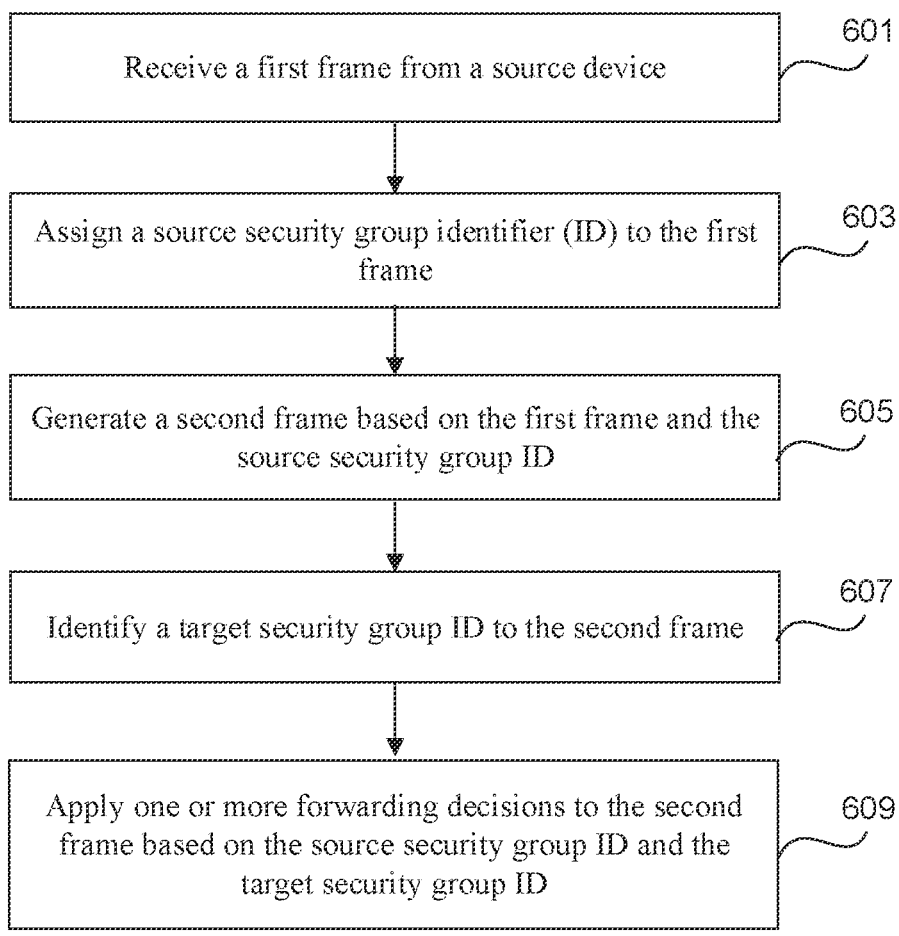

601 — Receive a first frame from a source device

603 — Assign a source security group identifier (ID) to the first frame

605 — Generate a second frame based on the first frame and the source security group ID 607 — Identify a target security group ID to the second frame 609 — Apply one or more forwarding decisions to the second frame based on the source security group ID and the target security group ID

FIG. 6

SHORTEST PATH BRIDGING (SPB) SECURITY GROUP POLICY

BACKGROUND

Field

The described aspects generally relate to security group policy. For example, some aspects of this disclosure relate to security group policy for Shortest Path Bridging (SPB)-Media Access Control (MAC) (SPBM).

Related Art

For communication networks, such as network overlay based networks (e.g., fabric network), the network security can be tied to network configuration elements, such as Internet Protocol (IP) addresses, MAC addresses, and the like. The network elements can be grouped into virtual local area networks (VLAN) and/or virtual routing and forwarding (VRF) based on, for example, the IP addresses of the network elements. However, in order to generate communication groups outside of the VLANs and/or VRFs, filter policies are needed to be applied. These filter policies can become very complex very quickly when the network elements increase.

SUMMARY

Some aspects of this disclosure include apparatuses and methods for implementing a security group policy. The security group policy can be applied as an overlay construct over the network addressing where the users and/or user devices can be placed in different groups and their data traffic can be marked accordingly. The security group policy can be applied to different infrastructures and/or different traffic for providing the network security.

Some aspects of this disclosure are discussed with respect to the security group policy for Shortest Path Bridging (SPB)-Media Access Control (MAC) (SPBM) (e.g., as described in IEEE 802.1Q). However, the aspects of this disclosure are not limited to SPBM, and the security group policy can be used with other networks, infrastructures, and/or traffic.

The security group policy can be a way of defining global traffic forwarding decisions at the network fabric level. The traffic forwarding decisions can be based on assigning a source security group identifier (ID) (e.g., a "Source-Security-Group-ID") on an ingress Backbone Edge Bridge (BEB) that receives a frame on a User to Network Interface (UNI). The traffic forwarding decisions can also be based on transporting the source security group ID across Backbone Core Bridges (BCB) that can perform Network to Network Interface (NNI) to NNI forwarding.

The traffic forwarding decisions can also be based on identifying a target security group ID (e.g., a "Target-Security-Group-ID") on an egress Backbone Edge Bridge (BEB) that sends the frame out to a User to Network Interfaces (UNI). A series of forwarding decisions can be applied to the frame based on the source security group ID of the frame and the target security group ID of the frame. In addition to the source security group ID and the target security group ID, the series of forwarding decisions can be based on other criteria such as, but not limited to, a 5 tuple (e.g., source and destination IP address, source and destination port, protocol) to each individual frame, based on a pre-defined policy.

According to some aspects, the security group policy can apply security groups to networks (such as a SPBM fabric). The security group policy can apply security groups to end to end for any service or traffic flow such as, but not limited to, Layer 2 (L2) bridged traffic, Layer 3 (L3) routed traffic in Global Routing Table (GRT) or VRF for Internet Protocol version 4 (IPv4) and/or IPv6, unicast, multicast, or the like.

According to some aspects, the security group policy can use double tagging format by keeping a Backbone VLAN tag and adding a new tag for the security group ID (e.g., an outer tag for Backbone VLAN and an inner tag for security group ID). Additionally, or alternatively, the security group policy can augment fabrics with a flexible security infrastructure extending beyond the current per-service segmentation.

Some aspects of this disclosure relate to a method for applying a security group policy in a Shortest Path Bridging (SPB) network. The method includes receiving a first frame from a source device and assigning a source security group identifier (ID) to the first frame. The method further includes generating a second frame based on the first frame and the source security group ID and identifying a target security group ID for the second frame. The method also includes applying one or more forwarding decisions to the second frame based on the source security group ID and the target security group ID.

In some aspects, assigning the source security group ID includes determining a port on which the first frame is received and assigning the source security group ID based on the determined port.

In some aspects, assigning the source security group ID includes determining a client Media Access Control (MAC) (C-MAC) address associated with the source device and assigning the source security group ID based on the determined C-MAC address.

In some aspects, identifying the target security group ID includes determining a port on which the second frame is to be transmitted to a destination device and identifying the target security group ID based on the determined port.

In some aspects, identifying the target security group ID includes determining a client Media Access Control (MAC) (C-MAC) address associated with a destination device and identifying the target security group ID based on the determined C-MAC address.

In some aspects, assigning the source security group ID and the identifying the target security group ID includes assigning the source security group ID based on a first Instance Service Identifiers (I-SID) or a first virtual local area network (VLAN) and identifying the target security group ID based on a second I-SID or a second VLAN.

In some aspects, generating the second frame based on the first frame and the source security group ID includes adding a tag protocol identifier (TPID) field to the first frame and adding a source security group ID field to the first frame. The source security group ID field is immediately after the TPID field and a value of the TPID field indicates that the source security group ID field includes the source security group ID.

In some aspects, applying one or more forwarding decisions to the second frame based on the source security group ID and the target security group ID includes using a communication matrix to determine whether the source security group ID and the target security group ID are allowed to communicate. In response to determining that the source security group ID and the target security group ID are allowed to communicate, the second frame is forwarded to a destination device associated with the target security group ID.

Some aspects of this disclosure relate to a system for applying a security group policy in a Shortest Path Bridging (SPB) network. The system includes a memory and at least one processor coupled to the memory. The at least one processor is configured to receive a first frame from a source device and assign a source security group identifier (ID) to the first frame. The at least one processor is further configured to generate a second frame based on the first frame and the source security group ID and identify a target security group ID to the second frame. The at least one processor is further configured to apply one or more forwarding decisions to the second frame based on the source security group ID and the target security group ID.

Some aspects of this disclosure relate to a non-transitory computer-readable device having instructions stored thereon. When the instructions are executed by at least one computing device, the instructions cause the at least one computing device to perform operations for applying a security group policy in a Shortest Path Bridging (SPB) network. The operations include receiving a first frame from a source device and assigning a source security group identifier (ID) to the first frame. The operations further include generating a second frame based on the first frame and the source security group ID and identifying a target security group ID to the second frame. The operations also include applying one or more forwarding decisions to the second frame based on the source security group ID and the target security group ID.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE DRAWINGS

The accompanying drawings are incorporated herein and form a part of the specification.

FIG. 5 illustrates an example frame for using the security group policy, according to some aspects of the disclosure.

FIG. 6 is a flowchart illustrating example operations for implementing and applying the security group policy, according to some aspects of this disclosure.

Figures 1A, 1B:
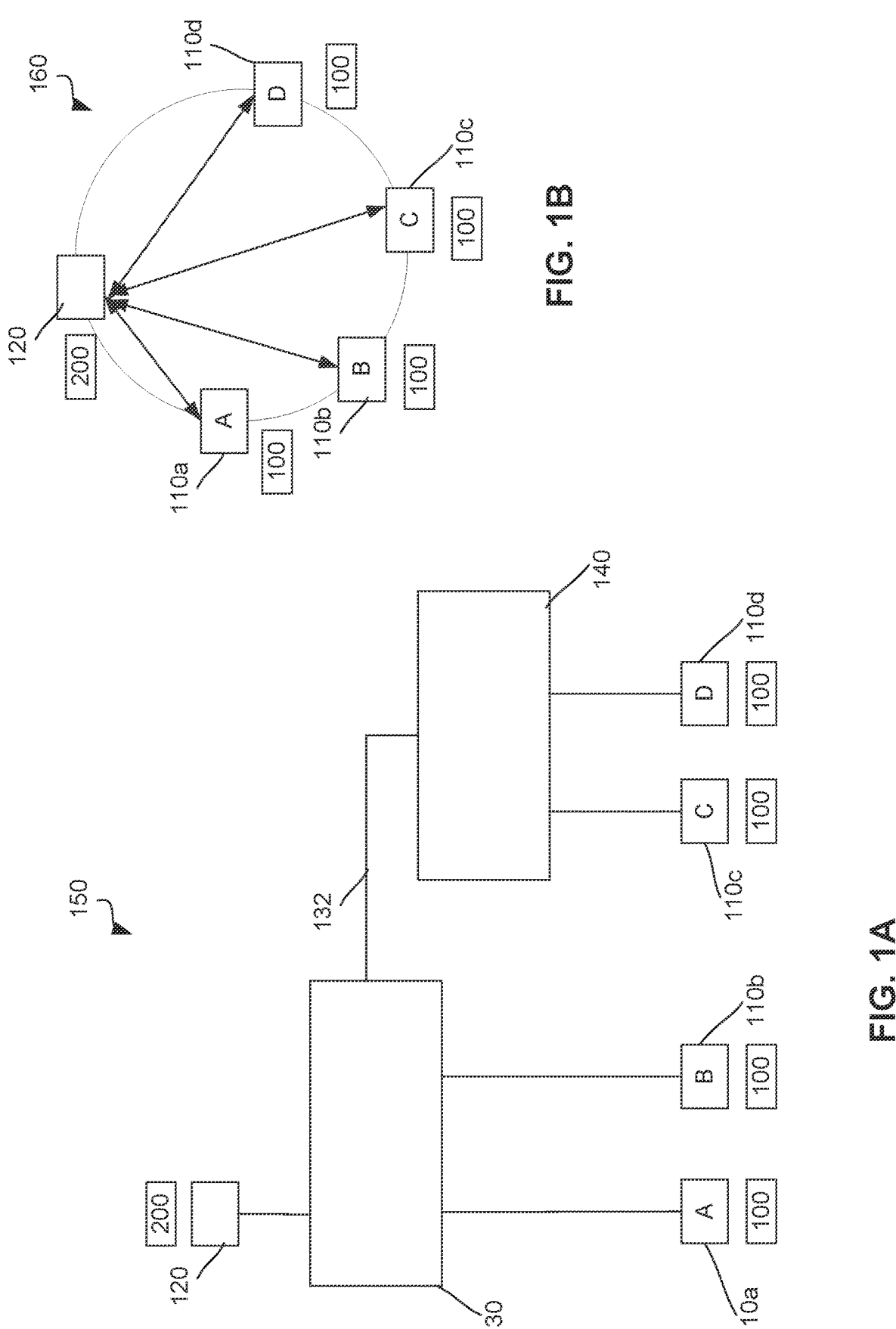
FIGS. 1A and 1B illustrate one exemplary system that implements the security group policy, according to some aspects of this disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Provided herein are system, apparatus, device, method and/or computer program product aspects, and/or combinations and sub-combinations thereof, for providing functionality for implementing security group policy.

FIGS. 1A and 1B illustrate one exemplary system that implements the security group policy, according to some aspects of this disclosure. FIG. 1A illustrates a physical topology 150 for implementing the security group policy. FIG. 1B illustrates an allowed traffic 160 for implementing the security group policy.

Physical topology 150 can include client devices 110a-110d, client device 120, and network switches 130 and 140. As illustrated in FIG. 1A, client devices 110a and 110b and client device 120 are coupled to switch 130 and client devices 110c and 110d are coupled to switch 140. Network switch 130 (also referred to as switch 130) can be coupled to network switch 140 (also referred to as switch 140) using a network 132. In some aspects, network 132 can include a Network to Network Interface (NNI). In some aspects, network 132 can be a Layer 2 Virtual Service Network (L2VSN). In some aspects, network 132 can be a Layer 3 Virtual Service Network (L3VSN). In some aspects, network 132 can be a bridged network, a route network, a GRT network, a VRF network, a unicast network, a multicast network, or the like. The security group policy of this disclosure can be applied transparently (as an additional forwarding decision, without changing service definition) to any forwarded frame (such as, but not limited to, bridged traffic/L2VSN, routed traffic in GRT or VRF/L3VSN, Unicast, Multicast over SPB or any other SPBM service).

According to some aspects, switch 130 can be part of a double tagging format. In some examples, the double tagging format can include an outer tag representing a Backbone VLAN and an inner tag representing the source security group ID.

Although physical topology 150 is illustrated to include five client devices and two switches, the aspects of this disclosure are not limited to this example. Physical topology 150 can include any number of client devices, switches, and networks. In one non-limiting example, physical topology 150 can include one switch where all the client devices are connected to that switch. In this example, the client devices 110a-110d (also referred to collectively as client device 110) and/or client device 120 can be part of one network and/or be part of one sub-network. In another non-limiting example, the client devices 110 and/or client device 120 can be spread across multiple networks and/or sub-network with a large number of switches between them.

The client devices 110 and/or client device 120 can include devices such as, but not limited to, laptops, desktops, tablets, wireless communication devices, smart phones, personal assistants, monitors, televisions, wearable devices, Internet-of-thing (IoT) devices, routers, switches and the like. The client device 120 can also include a firewall device. In some aspects, the firewall device can be a device for connection to, for example, the Internet.

Switches 130 and 140 can include any network switch connecting devices and enabling the devices to communicate with each other. Switches 130 and 140 can be configured to receive traffic (e.g., data traffic such as data frames/packets) from the client devices 110 and/or 120, and can route the traffic to destination devices. In some aspects, switches 130 and 140 can be edge switches coupled to the client devices 110 and/or 120.

Allowed traffic 160 of FIG. 1B illustrates which client devices are allowed to communicate with each other. Allowed traffic 160 of FIG. 1B is further illustrated in communication matrix of Table 1. Allowed traffic 160 of FIG. 1B and the communication matrix of Table 1 include the security group policy.

TABLE 1

|  | 100 | 200 |
|---|---|---|
| 100 | N | Y |
| 200 | Y | Y |

As illustrated in allowed traffic 160 of FIG. 1B (and summarized in the communication matrix of Table 1), client device 110a is allowed to communicate with client device 120. Client device 110b is allowed to communicate with client device 120. Client device 110c is allowed to communicate with client device 120. Client device 110d is allowed to communicate with client device 120. Client devices 110 are not allowed to communicate with each other. Client device 120 is allowed to communicate with other client devices 120 and client devices 110.

According to some aspects, switch 130 is configured to assign a source security group ID client device 110a. Similarly, switch 130 is configured to assign a source security group ID to client device 110b. Switch 130 assigns the source security group IDs to client devices 110a and 110b assuming that client devices 110a and 110b are source client devices sending traffic. As illustrated in FIG. 1A, switch 130 is configured to assign a source security group ID of 100 to client device 110a and to client device 110b. Switch 130 can also assign a source security group ID to client device 120. As illustrated in FIG. 1A, switch 130 can assign a source security group ID of 200 to client device 120.

Similarly, switch 140 is configured to assign a target security group ID to client device 110c. Similarly, switch 140 is configured to assign a target security group ID to client device 110d. Switch 140 assigns the target security group IDs to client devices 110c and 110d assuming that client devices 110c and 110d are destination client devices receiving the traffic sent by client devices 110a and/or 110b. As illustrated in FIG. 1A, switch 140 is configured to assign a target security group ID of 100 to client device 110c and to client device 110d.

When switch 130 receives traffic (e.g., data traffic such as data frames/packets) from client device 110a, switch 130 can determine that the traffic is coming from client device 110a. Switch 130 can determine that client device 110a has the source security group ID 100. Switch 130 can assign the source security group ID to the received traffic. For example, and as discussed in more detail below, switch 130 can add the source security group ID to the received traffic. Additionally, or alternatively, switch 130 can receive the traffic (e.g., data traffic such as data frames/packets) that already has the source security group ID. For example, a node (e.g., an access node—not shown) can be located between client device 110a and switch 130. The node can be configured to add the source security group ID to the traffic sent from client device 110a.

Switch 130 can then route the traffic that includes the source security group ID to switch 140 through network 132. Switch 130 can use any applicable method to route the traffic. For example, switch 130 can use IP addresses, MAC addresses, or the like associated with the traffic (that now also includes the source security group ID) to route the traffic to switch 140.

After receiving the routed traffic, switch 140 can determine the destination of the routed traffic. Switch 140 can use any applicable method to determine the destination client device. For example, switch 140 can use destination IP address, destination MAC address, or the like of the routed traffic to determine the destination client device. For example, switch 140 can determine that client device 110c is the destination client device. Switch 140 then determines a target security group ID associated with the client device 110c. In this example, switch 140 determines that client device 110c has the target security group ID 100. Switch 140 then uses the communication matrix of Table 1, the source security group ID, and the target security group ID to determine whether to forward the traffic to client device 110c. In this example, since client devices 110a and 110c are not allowed to communicate (as indicated in the communication matrix of Table 1), switch 140 does not forward the traffic from client device 110a to client device 110c. In some examples, switch 140 can drop the traffic.

As discussed above, although two switches 130 and 140 are illustrated in FIG. 1A, the operation discussed above can be performed within one switch. In that example, client devices 110a-110d and client device 120 are coupled to one switch. Alternatively, the operation discussed above can be performed across multiple switches.

Communication matrix of Table 1 can be stored in switch 130 and/or switch 140. For example, one or more copies of communication matrix of Table 1 can be stored as a table or other data structures in a memory in switch 130 and/or switch 140. Communication matrix of Table 1 can be generated throughout physical topology 150.

According to some aspects, the security group IDs (source security group ID and target security group ID) can be assigned and/or identified based on user-network interface (UNI) port. For example, all traffic received on (and/or client devices connected to) a specified UNI port will get the port-attributed source security group ID and all traffic transmitted on (and/or client devices connected to) the same UNI port will receive the port-attributed target security group ID. For example, all traffic received on (and/or client devices connected to) a specified UNI port of ingress switch 130 will get the port-attributed source security group ID and all traffic transmitted on (and/or client devices connected to) the same UNI port of switch 140 will receive the port-attributed target security group ID.

Additionally, or alternatively, security group IDs can be assigned based on Client (or Customer) MAC address (C-MAC address) regardless of ingress port, also allowing multiple security group IDs on the same port. Received traffic (e.g., frames) get the C-MAC-attributed source security group ID based on C-MAC source address (CMAC SA). Frames from traffic flows in the opposite direction get the target security group ID based on C-MAC destination address (CMAC DA).

Additionally, or alternatively, security group IDs can be assigned based on forwarding I-SID (Instance Service ID) or VLAN, allowing multiple security group IDs on the same port. In a non-limiting example, switch 130 can be part of a first VLAN. The source security group ID can be assigned based on the first VLAN of switch 130. In another non-limiting example, switch 140 can be part of a second VLAN. The target security group ID can be identified based on the second VLAN of switch 140. In some examples, the first VLAN is different from the second VLAN. In some examples, the first VLAN is the same as the second VLAN.

According to some aspects, the security group ID assignment based on port, C-MAC, I-SID, VLAN, or the like can be configured statically. Additionally, or alternatively, the security group ID assignment based on port, C-MAC, I-SID, VLAN, or the like can be provided via a database (e.g., a RADIUS database for carrying authentication and authorization data) or other means of configuration automation.

Figures 2A, 2B:
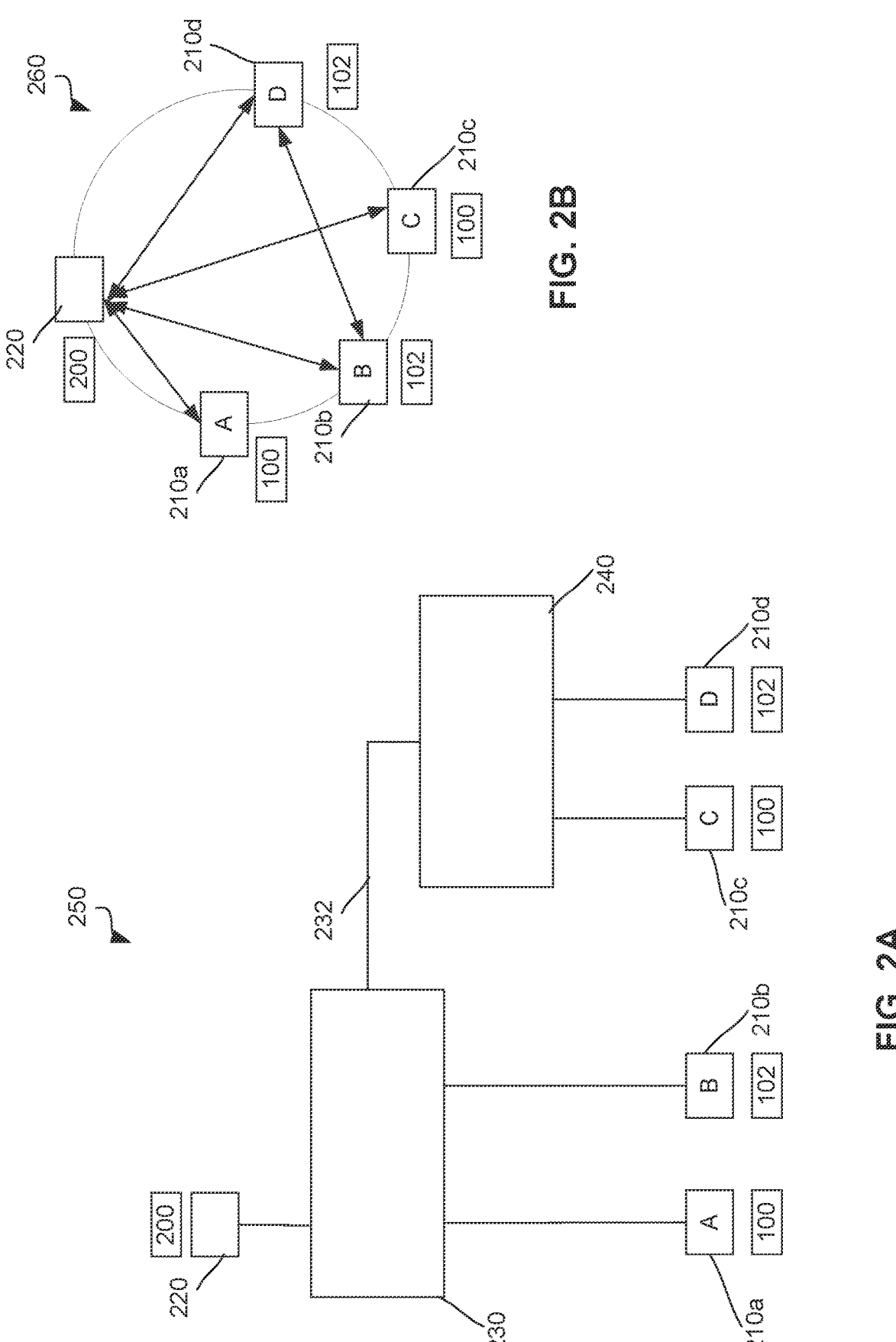
FIGS. 2A and 2B illustrate another exemplary system that implements the security group policy, according to some aspects of this disclosure.

FIGS. 2A and 2B illustrate another exemplary system that implements the security group policy, according to some aspects of this disclosure. FIG. 2A illustrates a physical topology 250 for implementing the security group policy. FIG. 2B illustrates an allowed traffic 260 for implementing the security group policy.

Physical topology 250 can include client devices 210a-210d, client device 220, and network switches 230 and 240. As illustrated in FIG. 2A, client devices 210a and 210b and client device 220 are coupled to switch 230 and client devices 210c and 210d are coupled to switch 240. Network switch 230 (also referred to as switch 230) can be coupled to network switch 240 (also referred to as switch 240) using a network 232. Network 232 can be similar to network 132 of FIGS. 1A and 1B.

Although physical topology 250 is illustrated to include five client devices and two switches, the aspects of this disclosure are not limited to this example. Physical topology 250 can include any number of client devices, switches, and networks. In one non-limiting example, physical topology 250 can include one switch where all the client devices are connected to that switch. In this example, the client devices 210a-210d (also referred to collectively as client device 210) and/or client device 220 can be part of one network and/or be part of one sub-network. In another non-limiting example, the client devices 210 and/or client device 220 can be spread across multiple networks and/or sub-network with a large number of switches between them.

The client devices 210, client device 220, and switches 230 and 240 can be similar to client devices 110, client device 120, and switches 130 and 140 of FIGS. 1A and 1B discussed above.

Allowed traffic 260 of FIG. 2B illustrates which client devices are allowed to communicate with each other. Allowed traffic 260 of FIG. 2B is further illustrated in communication matrix of Table 2. Allowed traffic 260 of FIG. 2B and the communication matrix of Table 2 include the security group policy.

TABLE 2

|  | 100 | 102 | 200 |
|---|---|---|---|
| 100 | N | N | Y |
| 102 | N | Y | Y |
| 200 | Y | Y | Y |

As illustrated in allowed traffic 260 of FIG. 2B (and summarized in the communication matrix of Table 2), client device 210a is allowed to communicate with client device 220. Client device 210b is allowed to communicate with client device 220 and client device 220d. Client device 210c is allowed to communicate with client device 220. Client device 210d is allowed to communicate with client device 220 and client device 210b. Client device 220 is allowed to communicate with other client devices 220 and client devices 210.

According to some aspects, switch 230 is configured to assign a source security group ID client device 210a. Similarly, switch 230 is configured to assign a source security group ID to client device 210b. Switch 230 assigns the source security group IDs to client devices 210a and 210b assuming that client devices 210a and 210b are source client devices sending traffic. As illustrated in FIG. 2A, switch 230 is configured to assign a source security group ID of 100 to client device 210a. Switch 230 is configured to assign a source security group ID of 102 to client device 210b. Switch 230 can also assign a source security group ID to client device 220. As illustrated in FIG. 2A, switch 230 can assign a source security group ID of 200 to client device 220.

Similarly, switch 240 is configured to assign a target security group ID to client device 210c. Similarly, switch 240 is configured to assign a target security group ID to client device 210d. Switch 240 assigns the target security group IDs to client devices 210c and 210d assuming that client devices 210c and 210d are destination client devices receiving the traffic sent by client devices 210a and/or 210b. As illustrated in FIG. 2A, switch 240 is configured to assign a target security group ID of 100 to client device 210c. Switch 240 is configured to assign a target security group ID of 102 to client device 210d.

When switch 230 receives traffic (e.g., data traffic such as data frames/packets) from client device 210b, switch 230 can determine that the traffic is coming from client device 210b. Switch 230 can determine that client device 210b has the source security group ID 102. Switch 230 can assign the source security group ID to the received traffic. For example, and as discussed in more detail below, switch 230 can add the source security group ID to the received traffic. Additionally, or alternatively, switch 230 can receive the traffic (e.g., data traffic such as data frames/packets) that already has the source security group ID. For example, a node (e.g., an access node—not shown) can be located between client device 210b and switch 230. The node can be configured to add the source security group ID to the traffic sent from client device 210b.

Switch 230 can then route the traffic that includes the source security group ID to switch 240 through network 232. Switch 230 can use any applicable method to route the traffic. For example, switch 230 can use IP addresses, MAC addresses, or the like associated with the traffic (that now also includes the source security group ID) to route the traffic to switch 240.

After receiving the routed traffic, switch 240 can determine the destination of the routed traffic. Switch 240 can use any applicable method to determine the destination client device. For example, switch 240 can use destination IP address, destination MAC address, or the like of the routed traffic to determine the destination client device. For example, switch 240 can determine that client device 210d is the destination client device. Switch 240 then determines a target security group ID associated with the client device 210d. In this example, switch 240 determines that client device 210d has the target security group ID 102. Switch 240 then uses the communication matrix of Table 2, the source security group ID, and the target security group ID to determine whether to forward the traffic to client device 210d. In this example, since client devices 210b and 210d are allowed to communicate (as indicated in the communication matrix of Table 2), switch 240 forwards the traffic from client device 210b to client device 210d.

As discussed above, although two switches 230 and 240 are illustrated in FIG. 2A, the operation discussed above can be performed within one switch. In that example, client devices 210a-210d and client device 220 are coupled to one switch. Alternatively, the operation discussed above can be performed across multiple switches.

Communication matrix of Table 2 can be stored in switch 230 and/or switch 240. For example, one or more copies of communication matrix of Table 2 can be stored as a table or other data structures in a memory in switch 230 and/or switch 240. Communication matrix of Table 2 can be generated throughout physical topology 250.

According to some aspects, the security group IDs (source security group ID and target security group ID) can be assigned as discussed above with respect to FIGS. 1A and 1B.

Figures 3A, 3B:
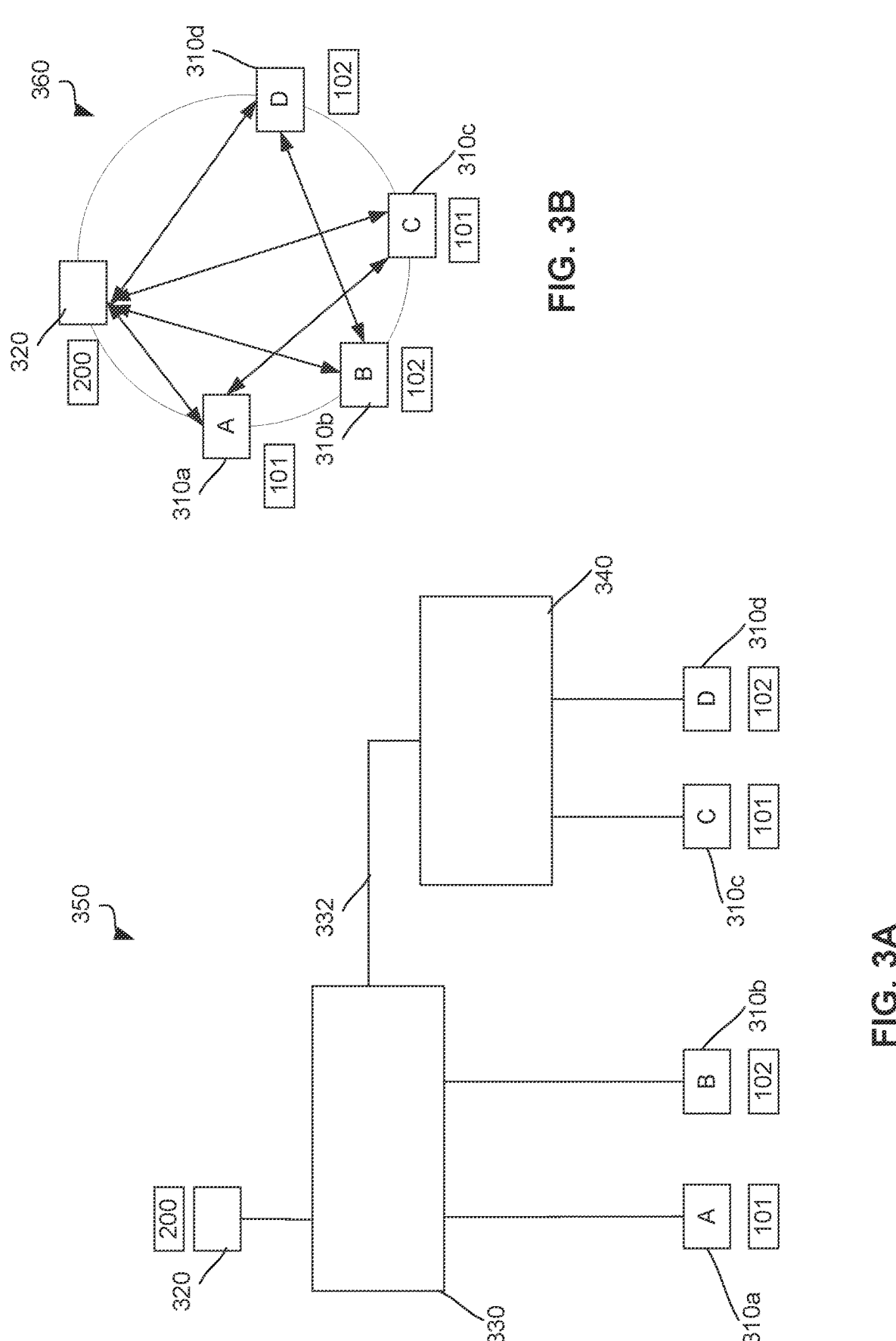
FIGS. 3A and 3B illustrate another exemplary system that implements the security group policy, according to some aspects of this disclosure.

FIGS. 3A and 3B illustrate another exemplary system that implements the security group policy, according to some aspects of this disclosure. FIG. 3A illustrates a physical topology 350 for implementing the security group policy. FIG. 3B illustrates an allowed traffic 360 for implementing the security group policy.

Physical topology 350 can include client devices 310a-310d, client device 320, and network switches 330 and 340. As illustrated in FIG. 3A, client devices 310a and 310b and client device 320 are coupled to switch 330 and client devices 310c and 310d are coupled to switch 340. Network switch 330 (also referred to as switch 330) can be coupled to network switch 340 (also referred to as switch 340) using a network 332. Network 332 can be similar to network 132 of FIGS. 1A and 1B.

Although physical topology 350 is illustrated to include five client devices and two switches, the aspects of this disclosure are not limited to this example. Physical topology 350 can include any number of client devices, switches, and networks. In one non-limiting example, physical topology 350 can include one switch where all the client devices are connected to that switch. In this example, the client devices 310a-310d (also referred to collectively as client device 310) and/or client device 320 can be part of one network and/or be part of one sub-network. In another non-limiting example, the client devices 310 and/or client device 320 can be spread across multiple networks and/or sub-network with a large number of switches between them.

The client devices 310, client device 320, and switches 330 and 340 can be similar to client devices 110, client device 120, and switches 130 and 140 of FIGS. 1A and 1B discussed above.

Allowed traffic 360 of FIG. 3B illustrates which client devices are allowed to communicate with each other. Allowed traffic 360 of FIG. 3B is further illustrated in communication matrix of Table 3. Allowed traffic 360 of FIG. 3B and the communication matrix of Table 3 include the security group policy.

TABLE 3

|     | 101 | 102 | 200 |
| --- | --- | --- | --- |
| 101 | Y   | N   | Y   |
| 102 | N   | Y   | Y   |
| 200 | Y   | Y   | Y   |

As illustrated in allowed traffic 360 of FIG. 3B (and summarized in the communication matrix of Table 3), client device 310a is allowed to communicate with client device 310c and client device 320. Client device 310b is allowed to communicate with client device 320 and client device 320d. Client device 310c is allowed to communicate with client device 310a and client device 320. Client device 310d is allowed to communicate with client device 320 and client device 310b. Client device 320 is allowed to communicate with other client devices 320 and client devices 310.

According to some aspects, switch 330 is configured to assign a source security group ID client device 310a. Similarly, switch 330 is configured to assign a source security group ID to client device 310b. Switch 330 assigns the source security group IDs to client devices 310a and 310b assuming that client devices 310a and 310b are source client devices sending traffic. As illustrated in FIG. 3A, switch 330 is configured to assign a source security group ID of 101 to client device 310a. Switch 330 is configured to assign a source security group ID of 102 to client device 310b. Switch 330 can also assign a source security group ID to client device 320. As illustrated in FIG. 3A, switch 330 can assign a source security group ID of 200 to client device 320.

Similarly, switch 340 is configured to assign a target security group ID to client device 310c. Similarly, switch 340 is configured to assign a target security group ID to client device 310d. Switch 340 assigns the target security group IDs to client devices 310c and 310d assuming that client devices 310c and 310d are destination client devices receiving the traffic sent by client devices 310a and/or 310b. As illustrated in FIG. 3A, switch 340 is configured to assign a target security group ID of 101 to client device 310c. Switch 340 is configured to assign a target security group ID of 102 to client device 310d.

When switch 330 receives traffic (e.g., data traffic such as data frames/packets) from client device 310b, switch 330 can determine that the traffic is coming from client device 310b. Switch 330 can determine that client device 310b has the source security group ID 102. Switch 330 can assign the source security group ID to the received traffic. For example, and as discussed in more detail below, switch 330 can add the source security group ID to the received traffic. Additionally, or alternatively, switch 330 can receive the traffic (e.g., data traffic such as data frames/packets) that already has the source security group ID. For example, a node (e.g., an access node—not shown) can be located between client device 310b and switch 330. The node can be configured to add the source security group ID to the traffic sent from client device 310b.

Switch 330 can then route the traffic that includes the source security group ID to switch 340 through network 332. Switch 330 can use any applicable method to route the traffic. For example, switch 330 can use IP addresses, MAC addresses, or the like associated with the traffic (that now also includes the source security group ID) to route the traffic to switch 340.

After receiving the routed traffic, switch 340 can determine the destination of the routed traffic. Switch 340 can use any applicable method to determine the destination client device. For example, switch 340 can use destination IP address, destination MAC address, or the like of the routed traffic to determine the destination client device. For example, switch 340 can determine that client device 310c is the destination client device. Switch 340 then determines a target security group ID associated with the client device 310c. In this example, switch 340 determines that client device 310c has the target security group ID 101. Switch 340 then uses the communication matrix of Table 3, the source security group ID, and the target security group ID to determine whether to forward the traffic to client device 310c. In this example, since client devices 310b and 310c are not allowed to communicate (as indicated in the communication matrix of Table 3), switch 340 does not forward the traffic from client device 310b to client device 310c.

As discussed above, although two switches 330 and 340 are illustrated in FIG. 3A, the operation discussed above can be performed within one switch. In that example, client devices 310a-310d and client device 320 are coupled to one switch. Alternatively, the operation discussed above can be performed across multiple switches.

Communication matrix of Table 3 can be stored in switch 330 and/or switch 340. For example, one or more copies of communication matrix of Table 3 can be stored as a table or other data structures in a memory in switch 330 and/or switch 340. Communication matrix of Table 3 can be generated throughout physical topology 350.

According to some aspects, the security group IDs (source security group ID and target security group ID) can be assigned as discussed above with respect to FIGS. 1A and 1B.

Figures 4A, 4B:
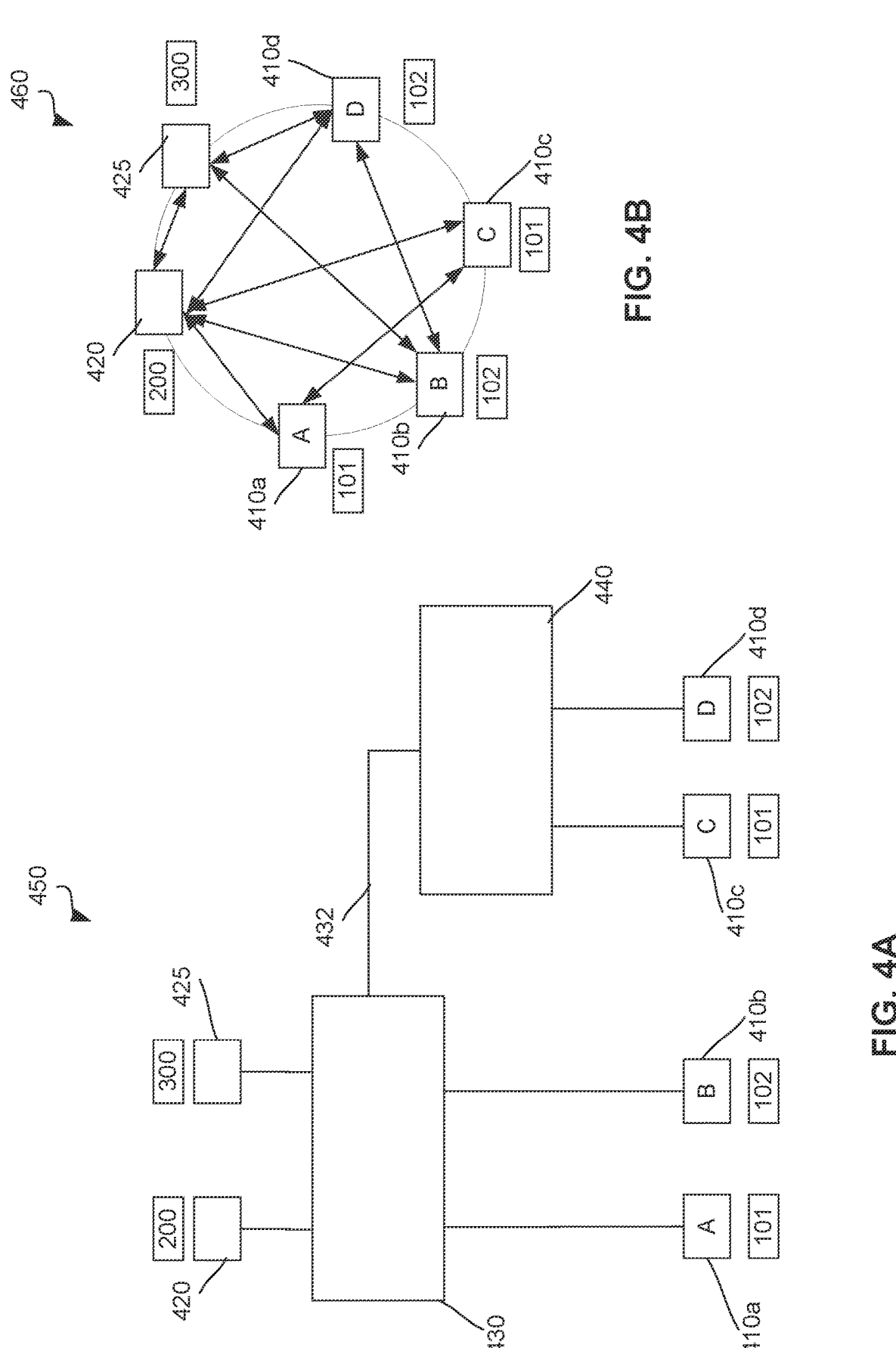
FIGS. 4A and 4B illustrate another exemplary system that implements the security group policy, according to some aspects of this disclosure.

FIGS. 4A and 4B illustrate another exemplary system that implements the security group policy, according to some aspects of this disclosure. FIG. 4A illustrates a physical topology 450 for implementing the security group policy. FIG. 4B illustrates an allowed traffic 460 for implementing the security group policy.

Physical topology 450 can include client devices 410a-410d, client device 420, device 425, and network switches 430 and 440. As illustrated in FIG. 4A, client devices 410a and 410b, client device 420, and device 425 are coupled to network switch 430 and client devices 410c and 410d are coupled to network switch 440. Network switch 430 (also referred to as switch 430) can be coupled to network switch 440 (also referred to as switch 440) using a network 432. Network 432 can be similar to network 132 of FIGS. 1A and 1B.

Although physical topology 450 is illustrated to include five client devices, one additional device, and two switches, the aspects of this disclosure are not limited to this example. Physical topology 450 can include any number of client devices, switches, and networks. In one non-limiting example, physical topology 450 can include one switch where all the client devices are connected to that switch. In this example, the client devices 410a-410d (also referred to collectively as client device 410), client device 420, and/or device 425 can be part of one network and/or be part of one sub-network. In another non-limiting example, the client devices 410 and/or client device 420 can be spread across multiple networks and/or sub-network with a large number of switches between them.

The client devices 410, client device 420, and switches 430 and 440 can be similar to client devices 110, client device 120, and switches 130 and 140 of FIGS. 1A and 1B discussed above. Additionally, device 425 can include any computing device such as, but not limited to, laptops, desktops, tablets, wireless communication devices, smart phones, personal assistants, monitors, televisions, wearable devices, Internet-of-thing (IoT) devices, routers, switches and the like.

Allowed traffic 460 of FIG. 4B illustrates which client devices are allowed to communicate with each other. Allowed traffic 460 of FIG. 4B is further illustrated in communication matrix of Table 4. Allowed traffic 460 of FIG. 4B and the communication matrix of Table 4 include the security group policy.

TABLE 4

|  | 101 | 102 | 200 | 300 |
|---|---|---|---|---|
| 101 | Y | N | Y | N |
| 102 | N | Y | Y | Y |

TABLE 4-continued

|  | 101 | 102 | 200 | 300 |
|---|---|---|---|---|
| 200 | Y | Y | Y | Y |
| 300 | N | Y | Y | Y |

As illustrated in allowed traffic 460 of FIG. 4B (and summarized in the communication matrix of Table 4), client device 410a is allowed to communicate with client device 410c and client device 420. Client device 410b is allowed to communicate with client device 420, device 425, and client device 420d. Client device 410c is allowed to communicate with client device 410a and client device 420. Client device 410d is allowed to communicate with client device 420, device 425, and client device 410b. Client device 420 is allowed to communicate with other client devices 420 and client devices 410. Device 425 is allowed to communicate with other devices 425 and client devices 410b and 410d.

According to some aspects, switch 430 is configured to assign a source security group ID client device 410a. Similarly, switch 430 is configured to assign a source security group ID to client device 410b. Switch 430 assigns the source security group IDs to client devices 410a and 410b assuming that client devices 410a and 410b are source client devices sending traffic. As illustrated in FIG. 4A, switch 430 is configured to assign a source security group ID of 101 to client device 410a. Switch 430 is configured to assign a source security group ID of 102 to client device 410b. Switch 430 can also assign a source security group ID to client device 420 and a source security group ID to device 425. As illustrated in FIG. 3A, switch 430 can assign a source security group ID of 200 to client device 420. As illustrated in FIG. 3A, switch 430 can assign a source security group ID of 300 to device 425.

Similarly, switch 440 is configured to assign a target security group ID to client device 410c. Similarly, switch 440 is configured to assign a target security group ID to client device 410d. Switch 440 assigns the target security group IDs to client devices 410c and 410d assuming that client devices 410c and 410d are destination client devices receiving the traffic sent by client devices 410a and/or 410b. As illustrated in FIG. 4A, switch 440 is configured to assign a target security group ID of 101 to client device 410c. Switch 440 is configured to assign a target security group ID of 102 to client device 410d.

When switch 430 receives traffic (e.g., data traffic such as data frames/packets) from client device 410b, switch 430 can determine that the traffic is coming from client device 410b. Switch 430 can determine that client device 410b has the source security group ID 102. Switch 430 can assign the source security group ID to the received traffic. For example, and as discussed in more detail below, switch 430 can add the source security group ID to the received traffic. Additionally, or alternatively, switch 430 can receive the traffic (e.g., data traffic such as data frames/packets) that already has the source security group ID. For example, a node (e.g., an access node—not shown) can be located between client device 410b and switch 430. The node can be configured to add the source security group ID to the traffic sent from client device 410b.

Switch 430 can then route the traffic that includes the source security group ID to switch 440 through network 432. Switch 430 can use any applicable method to route the traffic. For example, switch 430 can use IP addresses, MAC addresses, or the like associated with the traffic (that now also includes the source security group ID) to route the traffic to switch 440.

After receiving the routed traffic, switch 440 can determine the destination of the routed traffic. Switch 440 can use any applicable method to determine the destination client device. For example, switch 440 can use destination IP address, destination MAC address, or the like of the routed traffic to determine the destination client device. For example, switch 440 can determine that client device 410*d* is the destination client device. Switch 440 then determines a target security group ID associated with the client device 410*d*. In this example, switch 440 determines that client device 410*d* has the target security group ID 102. Switch 440 then uses the communication matrix of Table 4, the source security group ID, and the target security group ID to determine whether to forward the traffic to client device 410*d*. In this example, since client devices 410*b* and 410*d* are allowed to communicate (as indicated in the communication matrix of Table 4), switch 440 forwards the traffic from client device 410*b* to client device 410*d*.

As discussed above, although two switches 430 and 440 are illustrated in FIG. 4A, the operation discussed above can be performed within one switch. In that example, client devices 410*a*-410*d* and client device 420 are coupled to one switch. Alternatively, the operation discussed above can be performed across multiple switches.

Communication matrix of Table 4 can be stored in switch 430 and/or switch 440. For example, one or more copies of communication matrix of Table 4 can be stored as a table or other data structures in a memory in switch 430 and/or switch 440. Communication matrix of Table 4 can be generated throughout physical topology 450.

According to some aspects, the security group IDs (source security group ID and target security group ID) can be assigned as discussed above with respect to FIGS. 1A and 1B.

Although the communication matrixes of Tables 1-4 illustrates whether different devices with different security group IDs can communicate or not, the aspects of this disclosure can include additional information in the communication matrixes of Tables 1-4. For example, the communication matrixes of Tables 1-4 can indicate what protocols different devices with different security group IDs can use to communicate with each other. In a non-limiting example referring to Table 4, the communication matrix of Table 4 can indicate that group security ID 102 can use communication protocols 1 and 3 (e.g., Internet Protocol (IP) and Hypertext Transfer Protocol (HTTP)) to communicate with group security ID 200. However, the communication matrix of Table 4 can indicate that group security ID 102 cannot use communication protocols 2 and 4 (e.g., File Transfer Protocol (FTP) and Application Programming Interface (API)) to communicate with group security ID 200. In other words, the communication matrixes of Tables 1-4 can indicate the types of protocols that different devices with different security group IDs are allowed to use to communicate with each other.

As discussed above in the exemplary systems that implement the security group policy, the security group policy is independent of the network(s) that the security group policy is overlaid. Also, the security group policy is independent of the routing protocols and mechanism that the network(s) that the security group policy is overlaid.

According to some aspects, the security group IDs can be added, removed, preserved, and/or replaced when traffic (e.g., data traffic such as data frames/packets) are forwarded by multi-area SPBM boundary nodes across area boundaries. For example, a multi-area SPBM can include a plurality of areas, each area including a plurality of network nodes. According to some aspects, the multi-area SPB fabric/network is a SPB network with smaller networks in multiple areas connected hierarchically or in any loop free flexible topology. One or more boundary nodes can be shared between two areas at the boundary between the two areas. In other words, in the multi-area SPB architecture, a boundary node can interconnect with multiple areas. The security group IDs discussed in this disclosure can be added, removed, preserved, and/or replaced when traffic (e.g., data traffic such as data frames/packets) are forwarded by multi-area SPBM boundary nodes across area boundaries.

FIG. 5 illustrates an example frame 500 for using the security group policy, according to some aspects of the disclosure. The security group policy can be applied to different frames. For example, as discussed above, the security group policy of this disclosure can be applied transparently (as an additional forwarding decision, without changing service definition) to any forwarded frame (such as, but not limited to, bridged traffic/L2VSN, routed traffic in GRT or VRF/L3VSN, Unicast, Multicast over SPB or any other SPBM service).

Frame 500 of FIG. 5 illustrates the security group policy being applied to an encapsulated traffic (e.g., a MAC-in-MAC frame). For example, frame 500 can be based on SPBM using the 802.1ah MAC-in-MAC frame format where security group ID field 511 is added. However, the aspects of this disclosure are not limited to this example and the security group policy can be applied to other frames such as non-encapsulated traffic (e.g., an IP frame).

Frame 500 can include a MAC destination address (DA) field 501 (e.g., a Backbone MAC (BMAC) DA) and a MAC source address (SA) field 503 (e.g., a BMAC SA). In a non-limiting example that frame 500 is sent by client device 110*a* of FIG. 1A to client device 110*d* of FIG. 1A, MAC SA field 503 can be the MAC SA of a first network node connected to client device 110*a*. MAC DA field 501 can be the MAC DA of a second network node connected to client device 110*d*.

Frame 500 can further include a tag protocol identifier (TPID) field 505 and a VLAN ID (VID) field 507. In some examples, TPID field 505 can identify the protocol type of a tag. For example, the TPID value of TPID field 505 can indicate that frame 500 includes a VLAN tag (e.g., VID field 507).

Frame 500 can further include a second TPID field 509 and a security group ID field 511. In some aspects, the TPID value of second TPID field 509 can indicate that frame 500 includes security group ID field 511 and that security group ID field 511 is used for the security group policy. In a non-limiting example, second TPID field 509 can be 16 bits and security group ID field 511 can be 12 bits. However, the aspects of this disclosure are not limited to these examples.

In a non-limiting example, when switch 130 of FIG. 1A receives a frame from client device 110*a*, switch 130 can determine a source security group ID for the received frame as discussed above. Switch 130 can add the determined source security group ID to the frame. For example, switch 130 can modify frame 500 to add security group ID field 511 that includes the determined source security group ID. Additionally, switch 130 can add second TPID field 509 to indicate that frame 500 includes security group ID field 511 that includes the determined source security group ID. Second TPID field 509 can have predetermined value(s) for indicating that frame 500 includes security group ID field 511. For example, second TPID field 509 can have a unique value (e.g., an assigned value) for indicating that frame 500 includes security group ID field 511

When switch 140 receives frame 500, switch 140 can extract second TPID field 509. Based on the value of second TPID field 509, switch 140 can determine whether frame 500 includes security group ID field 511. If frame 500 includes security group ID field 511, switch 140 can determine the source security group ID based on security group ID field 511. Switch 140 can also determine a target security group ID for, for example, client device 110d using methods discussed above. Switch 140 can use the determined source and destination security group IDs and its communication matrix (e.g., Tables 1-4 above) to determine if switch 140 can forward frame 140 to the client device associated with MAC DA field 501.

Frame 500 can further include, for example, Ethertype 802.11ah field 513 indicating the existence of an 802.11ah frame. Frame 500 can further include I-SID field 515 indicating the service ID of frame 500. Frame 500 can also include C-MAC destination address (CMAC DA) field 517 and C-MAC source address (CMAC SA) field 519. Frame 500 can further include Ethertype 802.11Q field 513 indicating the existence of an 802.11Q frame. Frame 500 can further include a Core VLAN ID field (e.g., C-VID field 523). Frame 500 can further include Ethernet type length field 525, data fields 527, frame check sequence (FCS) field 529, or the like. In a non-limiting example that frame 500 is sent by client device 110a of FIG. 1A to client device 110d of FIG. 1A, the additional MAC SA field can be the MAC SA of client device 110a. The additional MAC DA field can be the MAC DA of client device 110d.

FIG. 6 illustrates an example method 600 for implementing and applying the security group policy, according to some aspects of this disclosure. As a convenience and not a limitation, FIG. 6 may be described with regard to elements of FIGS. 1-5. Method 600 may represent the operation of a system (e.g., switches 130, 140, 230, 240, 330, 340, 430, and/or 440) implementing the security group policy methods of this disclosure. Method 600 may also be performed by computer system 700 of FIG. 7. But method 600 is not limited to the specific aspects depicted in those figures and other systems may be used to perform the method as will be understood by those skilled in the art. It is to be appreciated that not all operations may be needed, and the operations may not be performed in the same order as shown in FIG. 6.

According to some aspects, all aspects of method 600 can be performed by one switch (e.g., switch 130, 230, 330, and/or 430). Additionally, or alternatively, some operations of method 600 can be performed by a first switch (e.g., switch 130, 230, 330, and/or 430) and some operations of method 600 can be performed by a second switch (e.g., switch 140, 240, 340, and/or 440) different from the first switch.

A 601, a first frame is received. For example a first switch (e.g., switch 130, 230, 330, 430) can receive a first frame. The first switch can receive the first frame from a source device (e.g., client devices 110a, 110b, 120, 210a, 210b, 220, 310a, 310b, 320, 410a, 410b, 420). The first frame can include a frame such as, but not limited to, a bridged frame/L2VSN, a routed traffic in GRT or VRF/L3VSN, a Unicast frame, a Multicast frame over SPB or any other SPBM service, or the like. In some aspects, the frame can include an Ethernet frame 513 of FIG. 5.

At 603, a source security group identifier (ID) is assigned to the first frame. For example, the first switch can assign the source security group ID to the first frame. Additionally, or alternatively, the first switch can assign the source security group to the source device. According to some aspects, the security group IDs (source security group ID and target security group ID) can be assigned and/or identified based on user-network interface (UNI) port. For example, the security group IDs can be assigned based on the port of the first switch on which the first frame is received. The assigning the source security group ID can include determining a port (e.g., a port on the first switch) on which the first frame is received and assigning the source security group ID based on the determined port.

Additionally, or alternatively, the security group IDs can be assigned based on Client (or Customer) MAC address (C-MAC address) regardless of the port. For example, the source security group ID can be assigned based on the C-MAC address (e.g., the MAC SA) of the source device. The assigning the source security group ID can include determining a C-MAC address associated with the source device and assigning the source security group ID based on the determined C-MAC address.

Additionally, or alternatively, security group IDs can be assigned based on forwarding I-SID (Instance Service ID) or VLAN. In a non-limiting example, the first switch can be part of a first VLAN. The source security group ID can be assigned based on the first VLAN of the first switch.

At 605, a second frame is generated based on the first frame and the source security group ID. For example, the first switch can generate the second frame based on the first frame and the source security group ID. In some aspects, the second frame can include frame 500 of FIG. 5. Generating the second frame based on the first frame and the source security group ID can include adding a tag protocol identifier (TPID) field to the first frame and adding a source security group ID field to the first frame. The source security group ID field is immediately after the TPID field and a value of the TPID field indicates that the source security group ID field includes the source security group ID. In some aspects, generating the second frame based on the first frame and the source security group ID can also include adding the MAC DA field 501, adding the MAC SA field 503, adding TPID field 505, and/or adding VID field 507 to the first frame (e.g., Ethernet frame 513).

At 607, a target security group ID for the second frame is identified. In some aspects, the first switch (e.g., switch 130, 230, 330, 430) can identify the target security group ID. In these aspects, the second frame is transmitted by the first switch to a destination device (e.g., client devices 110c, 110d, 210c, 210d, 310c, 310d, 410c, 410d) and not through any other switches. In other words, the destination device can be coupled to the first switch. Additionally, or alternatively, a second switch (e.g., switch 140, 240, 340, 440) can identify the target security group ID. In these aspects, the second frame is transmitted by the first switch to the second switch.

For example, the first switch and/or the second switch can identify the target security group ID for the second frame. Additionally, or alternatively, the first switch and/or the second switch can identify the target security group for the destination device. According to some aspects, the security group IDs (source security group ID and target security group ID) can be assigned and/or identified based on user-network interface (UNI) port. For example, the security group IDs can be assigned and/or identified based on the port of the first switch and/or the second switch on which the second frame is transmitted. The identifying the target security group ID can include determining a port (e.g., a port on the first switch and/or the second switch) on which the second frame is transmitted and identifying the target security group ID based on the determined port.

Additionally, or alternatively, the security group IDs can be assigned and/or identified based on Client (or Customer) MAC address (C-MAC address) regardless of the port. For example, the target security group ID can be identified based on the C-MAC address (e.g., the MAC SA) of the destination device. The identifying the target security group ID can include determining a C-MAC address associated with the destination device and assigning and/or identifying the target security group ID based on the determined C-MAC address.

Additionally, or alternatively, security group IDs can be assigned and/or identified based on forwarding I-SID (In-stance Service ID) or VLAN. In a non-limiting example, the first switch can part of the first VLAN. The target security group ID can be identified based on the first VLAN of the first switch. Additionally, or alternatively, the second switch can part of a second VLAN. The target security group ID can be identified based on the second VLAN of the second switch.

At 609, one or more forwarding decisions are applied to the second frame based on the source security group ID and the target security group ID. For example, the first switch and/or the second switch can apply the one or more forwarding decisions to the second frame based on the source security group ID and the target security group ID. In some aspects that the source and destination devices are coupled to the first switch without any other switches, the first switch can apply the one or more forwarding decisions. In some aspects that the source and destination devices are coupled to different switches (e.g., the first and second switches), the second switch can apply the one or more forwarding decisions.

In some aspects, applying the one or more forwarding decisions to the second frame based on the source security group ID and the target security group ID can include using a communication matrix to determine whether the source security group ID and the target security group ID are allowed to communicate. For example, the first switch and/or the second switch can store a copy of the communication matrix of Tables 1-4. The first switch and/or the second switch can use the communication matrix to determine whether the source security group ID and the target security group ID are allowed to communicate.

In response to determining that the source security group ID and the target security group ID are allowed to communicate, the first switch and/or the second switch can forward the second frame to the destination device associated with the target security group ID. In response to determining that the source security group ID and the target security group ID are not allowed to communicate, the first switch and/or the second switch can drop the second frame.

Additionally, or alternatively, the first switch and/or the second switch can use the communication matrix to determine what protocol to use (and/or what protocols are allowed for) for communication between the source security group ID and the target security group ID. The first switch and/or the second switch can use the determined allowed protocol for forwarding the second frame to the destination device.

The communication matrix can be updated and populated to different switches. For example, the communication matrix can be updated periodically. Additionally, or alternatively, the communication matrix can be updated if there is any change in the fabric. The communication matrix can be updated automatically and/or based on instructions form a user (e.g., a network administrator). Other methods for updating the communication matrix can also be used.

According to some aspects, method 600 of FIG. 6 is in addition to (e.g., overlaid on) any other forwarding decisions such as, but not limited to, bridging or routing.

Figure 7:
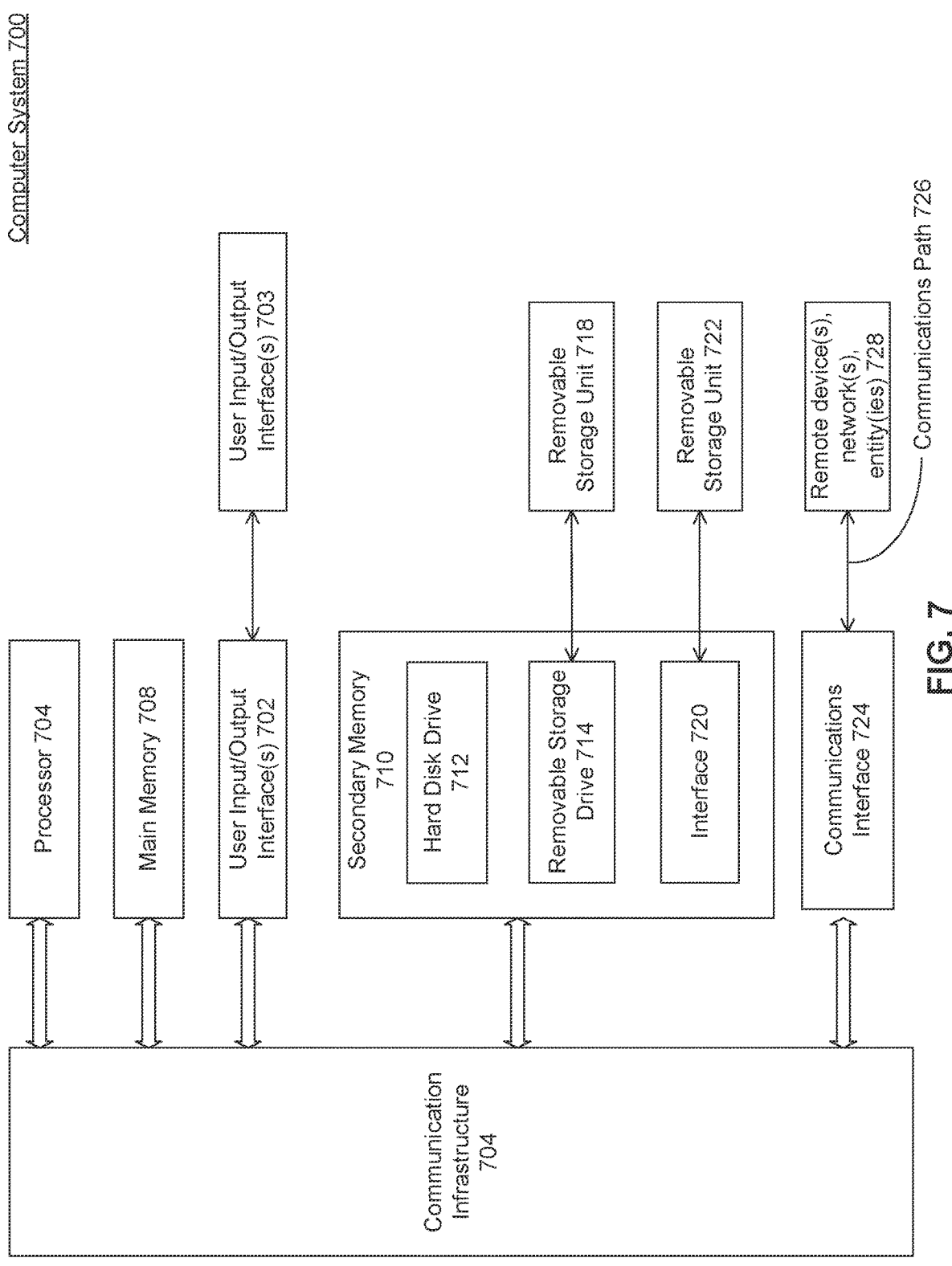
FIG. 7 is an example computer system for implementing various aspects.

Various aspects may be implemented, for example, using one or more computer systems, such as computer system 700 shown in FIG. 7. One or more computer systems 700 may be used, for example, to implement any aspect of the disclosure discussed herein, as well as combinations and sub-combinations thereof.

Computer system 700 may include one or more processors (also called central processing units, or CPUs), such as a processor 704. Processor 704 may be connected to a communication infrastructure or bus 706.

Computer system 700 may also include customer input/output device(s) 703, such as monitors, keyboards, pointing devices, etc., which may communicate with communication infrastructure 706 through customer input/output interface(s) 702.

One or more of processors 704 may be a graphics processing unit (GPU), an application-specific integrated circuit (ASIC), a neural processing unit (NPU), and/or a central processing unit (CPU). In an aspect, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage device or drive 714. Removable storage drive 714 may be a floppy disk drive, a magnetic tape drive, a compact disk drive, an optical storage device, tape backup device, and/or any other storage device/drive.

Removable storage drive 714 may interact with a removable storage unit 718. Removable storage unit 718 may include a computer usable or readable storage device having stored thereon computer software (control logic) and/or data. Removable storage unit 718 may be a floppy disk, magnetic tape, compact disk, DVD, optical storage disk, and/any other computer data storage device. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some aspects, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

Based on the teachings contained in this disclosure, it will be apparent to persons skilled in the relevant art(s) how to make and use aspects of this disclosure using data processing devices, computer systems and/or computer architectures other than that shown in FIG. 7. In particular, aspects can operate with software, hardware, and/or operating system implementations other than those described herein.

It is to be appreciated that the Detailed Description section, and not any other section, is intended to be used to interpret the claims. Other sections can set forth one or more but not all exemplary aspects as contemplated by the inventor(s), and thus, are not intended to limit this disclosure or the appended claims in any way.

While this disclosure describes exemplary aspects for exemplary fields and applications, it should be understood that the disclosure is not limited thereto. Other aspects and modifications thereto are possible, and are within the scope and spirit of this disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative aspects can perform functional blocks, steps, operations, methods, etc. using orderings different than those described herein.

References herein to "one aspect," "an aspect," "an example aspect," or similar phrases, indicate that the aspect described can include a particular feature, structure, or characteristic, but every aspect can not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein. Additionally, some aspects can be described using the expression "coupled" and "connected" along with their derivatives. These terms are not necessarily intended as synonyms for each other. For example, some aspects can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary aspects, but should be defined only in accordance with the following claims and their equivalents.

What is claimed is:

1. A method for applying a security group policy in a Shortest Path Bridging (SPB) network, the method comprising:

receiving a first frame from a source device;

assigning a source security group identifier (ID) to the first frame;

generating a second frame based on the first frame and the source security group ID by adding a tag protocol (TPID) field and a source security group ID field to the first frame;

identifying a target security group ID for the second frame; and applying one or more forwarding decisions to the second frame based on the source security group ID and the target security group ID by:

using a communication matrix to determine whether the source security group ID and the target security group ID are allowed to communicate; and in response to determining that the source security group ID and the target security group ID are allowed to communicate, forwarding the second frame to a destination device associated with the target security group ID.

2. The method of claim 1, wherein the assigning the source security group ID comprises:

determining a port on which the first frame is received; and assigning the source security group ID based on the determined port.

3. The method of claim 1, wherein the assigning the source security group ID comprises:

determining a client Media Access Control (MAC) (C-MAC) address associated with the source device; and assigning the source security group ID based on the determined C-MAC address.

4. The method of claim 1, wherein the identifying the target security group ID comprises:

determining a port on which the second frame is to be transmitted to a destination device; and identifying the target security group ID based on the determined port.

5. The method of claim 1, wherein the identifying the target security group ID comprises:

determining a client Media Access Control (MAC) (C-MAC) address associated with a destination device; and identifying the target security group ID based on the determined C-MAC address.

6. The method of claim 1, wherein the assigning the source security group ID and the identifying the target security group ID comprises:

assigning the source security group ID based on a first Instance Service Identifiers (I-SID) or a first virtual local area network (VLAN); and identifying the target security group ID based on a second I-SID or a second VLAN.

7. The method of claim 1, wherein:

the source security group ID field is immediately after the TPID field, and a value of the TPID field indicates that the source security group ID field includes the source security group ID.

8. A system for applying a security group policy in a Shortest Path Bridging (SPB) network, the system comprising:

a memory; and at least one processor coupled to the memory and configured to:

receive a first frame from a source device;

assign a source security group identifier (ID) to the first frame;

generate a second frame based on the first frame and the source security group ID by adding a tag protocol (TPID) field and a source security group ID field to the first frame;

identify a target security group ID for the second frame; and apply one or more forwarding decisions to the second frame based on the source security group ID and the target security group ID by:

using a communication matrix to determine whether the source security group ID and the target security group ID are allowed to communicate; and in response to determining that the source security group ID and the target security group ID are allowed to communicate, forwarding the second frame to a destination device associated with the target security group ID.

9. The system of claim 8, wherein to assign the source security group ID, the at least one processor is further configured to:

determine a port on which the first frame is received; and assign the source security group ID based on the determined port.

10. The system of claim 8, wherein to assign the source security group ID, the at least one processor is further configured to:

determine a client Media Access Control (MAC) (C-MAC) address associated with the source device; and assign the source security group ID based on the determined C-MAC address.

11. The system of claim 8, wherein to identify the target security group ID, the at least one processor is further configured to:

determine a port on which the second frame is to be transmitted to a destination device; and identify the target security group ID based on the determined port.

12. The system of claim 9, wherein to identify the target security group ID, the at least one processor is further configured to:

determine a client Media Access Control (MAC) (C-MAC) address associated with a destination device; and identify the target security group ID based on the determined C-MAC address.

13. The system of claim 8, wherein to assign the source security group ID and to assign the target security group ID, the at least one processor is further configured to:

assign the source security group ID based on a first Instance Service Identifiers (I-SID) or a first virtual local area network (VLAN); and identify the target security group ID based on a second I-SID or a second VLAN.

14. The system of claim 8, wherein:

the source security group ID field is immediately after the TPID field, and a value of the TPID field indicates that the source security group ID field includes the source security group ID.

15. A tangible computer-readable device having instructions stored thereon that, when executed by at least one processor, cause the at least one processor to perform operations for applying a security group policy in a Shortest Path Bridging (SPB) network, the operations comprising:

receiving a first frame from a source device;

assigning a source security group identifier (ID) to the first frame;

generating a second frame based on the first frame and the source security group ID;

identifying a target security group ID for the second frame; and applying one or more forwarding decisions to the second frame based on the source security group ID and the target security group ID by:

using a communication matrix to determine whether the source security group ID and the target security group ID are allowed to communicate; and in response to determining that the source security group ID and the target security group ID are allowed to communicate, forwarding the second frame to a destination device associated with the target security group ID.

16. The computer-readable device of claim 15, wherein the generating the second frame based on the first frame and the source security group ID comprises:

adding a tag protocol identifier (TPID) field to the first frame; and adding a source security group ID field to the first frame, wherein the source security group ID field is immediately after the TPID field, and wherein a value of the TPID field indicates that the source security group ID field includes the source security group ID.

17. The computer-readable device of claim 15, wherein:

the assigning the source security group ID comprises:

determining a first client Media Access Control (MAC) (C-MAC) address associated with the source device; and assigning the source security group ID based on the determined first C-MAC address, and the identifying the target security group ID comprises:

determining a second C-MAC address associated with a destination device; and assigning the target security group ID based on the determined second C-MAC address.

\* \* \* \* \*